United States Patent [19]

McRae

[11] Patent Number: 5,176,521
[45] Date of Patent: Jan. 5, 1993

[54] EDUCATIONAL APPARATUS WITH INTERCHANGEABLE TASK ASSIGNING TEMPLATE

[76] Inventor: Sam McRae, 6915 Mission Rd., Conesus, N.Y. 14435

[21] Appl. No.: 811,839

[22] Filed: Dec. 20, 1991

[51] Int. Cl.⁵ .............................................. G09B 1/10
[52] U.S. Cl. .................................. 434/407; 434/200; 434/204; 446/118
[58] Field of Search ................ 446/118; 434/407, 346, 434/200, 203, 204, 96; 273/282 B, 284, 283

[56] References Cited

U.S. PATENT DOCUMENTS

| | | | |
|---|---|---|---|
| 2,887,789 | 5/1959 | Bobo et al. | 273/282 B |
| 4,177,581 | 12/1979 | Walker | 434/200 |
| 4,809,980 | 3/1989 | Bertrand | 446/118 X |

FOREIGN PATENT DOCUMENTS

| | | | |
|---|---|---|---|
| 1121093 | 7/1956 | France | 446/118 |
| 278019 | 1/1952 | Switzerland | 446/118 |
| 1438483 | 6/1976 | United Kingdom | 434/200 |

Primary Examiner—Gene Mancene
Assistant Examiner—L. Thomas
Attorney, Agent, or Firm—Cumpston & Shaw

[57] ABSTRACT

The present invention provides an educational apparatus for creating both mental and physical tasks. The apparatus includes a peg board, manipulative members sized to cooperatively engage the peg board and a template for locating specific indicia with respect to the pegs on the peg board. Corresponding indicia are disposed on the manipulative members such that a preferred association exists between a given manipulative member and a given peg. The user initially performs the mental task of forming the preferred association, and subsequently performs the physical task of cooperatively engaging the manipulative member upon the corresponding peg.

3 Claims, 1 Drawing Sheet

EDUCATIONAL APPARATUS WITH INTERCHANGEABLE TASK ASSIGNING TEMPLATE

The present invention relates to an educational apparatus, and more particularly, to an educational apparatus including a base having a plurality of identical targets for cooperatively engaging a plurality of manipulative members. The apparatus further includes a template for assigning specific indicia to the manipulative members and targets, such that a preferred association exists between a given target and a given manipulative member.

BACKGROUND OF THE INVENTION

U.S. Pat. No. 4,188,734 to Rich discloses an educational toy having a board with a plurality of holes on a front surface and a plurality of holes in a back surface. The board includes a first set of indicia associated with the holes in the front surface and a second set of indicia associated with the holes in the back surface. The toy includes a plurality of pegs sized to be received within the holes, wherein each peg includes permanent indicia associating the peg with a given hole in the front surface and the back surface of the board.

U.S. Pat. No. 4,526,550 to Lurito discloses a combination system including a plurality of receivers and plugs having cooperable coding features which are coded according to unique rules such that a desired form of cooperation between the plug and the corresponding receiver is obtained only when the specific plug matches the code.

U.S. Pat. No. 3,374,558 to Smith discloses an educational aperture board having openings therein, a plurality of opaque overlay cards wherein each card includes a set of openings alignable with the openings in the aperture board, and a plurality of pegs sized to be received through the overlay and into the aperture board.

SUMMARY OF THE INVENTION

The present invention provides an educational apparatus, or toy for creating a variety of intellectual and physical tasks. Specifically, the present invention includes a peg board having a substantially planar surface and a plurality of regularly spaced pegs projecting from the planar surface. The apparatus includes a plurality of identical manipulative members having an aperture therein sized to receive a portion of the peg so as to retain the member relative to the peg board. A template overlays the peg board to be sandwiched between a manipulative member and the peg board. The template assigns a specific task or function to a given peg. The manipulative members include corresponding indicia which form a preferred association between a given manipulative member and a specific peg.

The associations or functions between the template (peg) and given manipulated member include, but are not limited to reading readiness activities, color and matching associations, i.e., size, shape and texture, mathematical functions and applications, and other preacademic and academic skills to be developed specifically in the form of the templates used in conjunction with the peg board.

In addition to the intellectual task of performing the preferred association, the present invention provides a physical task of cooperatively engaging with the manipulative member upon a corresponding peg.

DETAILED DESCRIPTION OF THE PREFERRED EMBODIMENT

Figure 1:
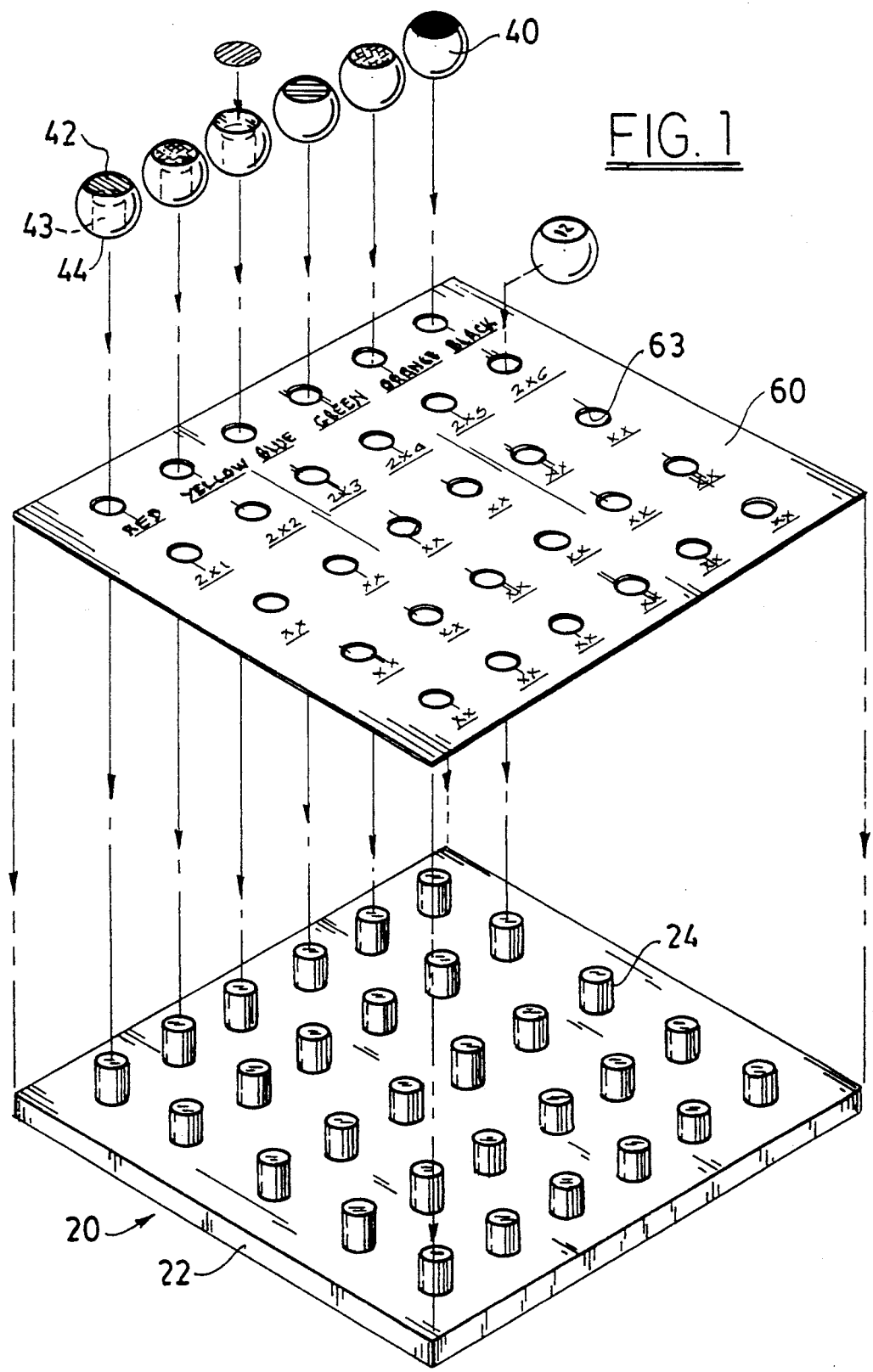
FIG. 1 is an exploded perspective view of the present invention.

Referring to FIG. 1, the present invention includes a peg board 20, a plurality of manipulative members 40, and a template 60.

The peg board 20 includes a substantially planar base 22 and a plurality of pegs 24 projecting from a planar surface of the base. The pegs 24 are regularly spaced from each other and permanently affixed to the base 22 to form targets. The pegs 24 define specific targets for providing a physical task. Preferably, the peg board 20 is approximately 12 inches square, having 25 pegs disposed upon the board at approximately 2 inch intervals along equal columns and rows. The pegs 24 are permanently affixed to the base 20 by means well known in the art, such as adhesives or threaded engagements. The pegs project from the surface of the base 22 by approximately ½ inch.

The manipulative members 40 are substantially identical. Each manipulative member 40 includes a recess 43 sized to receive substantially the entire length of the peg 24 as the peg projects from the base 22. The manipulative members 40 may define any of a variety of 3 dimensional figures including spherical, cylindrical, cubic, or pyramidal. In a preferred embodiment, the manipulative members 40 are substantially spherical having diametrically opposed flattened surfaces wherein one flattened surface forms an indicia surface 42 and the opposing flattened surface 44 includes the recess 43. The manipulative member 40 has a preferred diameter of approximately 1¾ inches. The manipulative member 44 may be colored, clear, or opaque, depending upon the desired application of the apparatus.

The template 60 is sized to be received on the peg board 20. The template 60 includes a plurality of apertures 63 corresponding to the pegs 24, such that the pegs project through apertures. The area of the template 60 surrounding each aperture 63 includes indicia to identify the specific peg 24. The indicia may be mathematical functions, results of mathematical functions, letters, words or colors.

The indicia surface 42 of the manipulative member 40 includes indicia corresponding to the indicia on the template 60. The corresponding indicia may be coded adhesive labels affixed to the indicia surface 42, or may be directly painted or formed on the manipulative member 40. The indicia of the template 60 and the manipulative member 40 define a preferred association between a given peg 24 and a given manipulative member. The template 60 and corresponding indicia of the manipulative members 40 are such that if the template includes a mathematical function or operation, a manipulative member includes the result of that function or operation.

The user must perform the mental step to make preferred association of indicia between the given peg, target and the manipulative member 40, and then perform the physical task of cooperatively engaging the manipulative member and the peg, or target.

The present invention thereby provides for both intellectual and physical tasking as the user must construct the preferred association between the indicia of the template 60 and the indicia on the manipulative member 40 and subsequently physically dispose the manipulative member, upon the proper peg 24. The spacing of the pegs 24 and size of the manipulative member 40 is such that a user may pass their fingers between manipulative members 40 disposed on adjacent pegs 24.

While a preferred embodiment of the invention has been shown and described with particularity, it will be appreciated that various changes and modifications may suggest themselves to one having ordinary skill in the art upon being apprised of the present invention. It is intended to encompass all such changes and modifications as fall within the scope and spirit of the appended claims.

What is claimed:

1. An educational toy, comprising:
   (a) a base having a plurality of substantially identical targets in a predetermined orientation;
   (b) a plurality of interchangeable manipulative members, wherein each member is adapted to be received on any one of the plurality of targets and each member having an indicia surface;
   (c) securing means for releasably securing a manipulative member to a target;
   (d) a template sized to releasably engage the base for labeling a given target with a given indicia; and
   (e) corresponding indicia on the manipulative members such that a given manipulative member corresponds to a given target.

2. An educational toy, comprising:
   (a) a pegboard having a plurality of pegs projecting from a surface of the pegboard;
   (b) a plurality of manipulative members, each manipulative member having a recess sized to receive a portion of a peg to retain the manipulative member relative to the pegboard;
   (c) a template having a plurality of apertures sized to receive a peg therethrough, the template including indicia associated with each peg as the peg projects through the template; and
   (d) corresponding indicia attached to each manipulative member for associating a given manipulative member with a given peg.

3. An educational toy, comprising:
   (a) a pegboard having a plurality of pegs projecting from a surface, the pegs spaced apart in a predetermined pattern;
   (b) a plurality of templates, each template having a plurality of apertures for receiving the pegs therethrough and a specific indicia associated with a given peg; and
   (c) a plurality of manipulative members adapted to cooperatively engage any one of the plurality of pegs, each manipulative member having corresponding indicia for forming a preferred association between a given peg and a given manipulative member.

* * * * *